United States Patent

[11] 3,599,907

[72] Inventors Stephen Ransom
 Annes-on-Sea;
 William N. Bainbridge, Lytham, both of,
 England
[21] Appl. No. 845,825
[22] Filed July 29, 1969
[45] Patented Aug. 17, 1971
[73] Assignee British Aircraft Corporation Limited
 London, England
[32] Priority July 29, 1968
[33] Great Britain
[31] 36090/68

[54] RETRACTABLE IN-FLIGHT REFUELLING PROBE
 5 Claims, 7 Drawing Figs.
[52] U.S. Cl. .................................................. 244/135
[51] Int. Cl. ....................................................... B64d 39/00
[50] Field of Search.......................................... 244/135

[56] References Cited
 UNITED STATES PATENTS
2,582,609  1/1952  Steele............................ 244/135
3,032,300  5/1962  Gadd............................. 244/135
 FOREIGN PATENTS
 695,200  8/1953  Great Britain................ 244/135
 OTHER REFERENCES
" Aviation Week," Vol. 67, No. 2, July 15, 1957, pp. 115

Primary Examiner—Milton Buchler
Assistant Examiner—Gregory W. O'Connor
Attorney—Sughrue, Rothwell, Mion, Zinn & Macpeak ABSTRACT: A fueling probe pivotally mounted on an aircraft has two telescoping fuel pipes. The probe is designed to pivot from a flushed position with the contours of the aircraft adjacent the pilot. One of the fuel pipes forms part of a hydraulic jack for telescoping the probe into position. The probe cover has rollers for permitting the relative movement of the fuel pipes. Means are provided for evacuating any leaking hydraulic oil to the atmosphere so that it does not mix with the fuel.

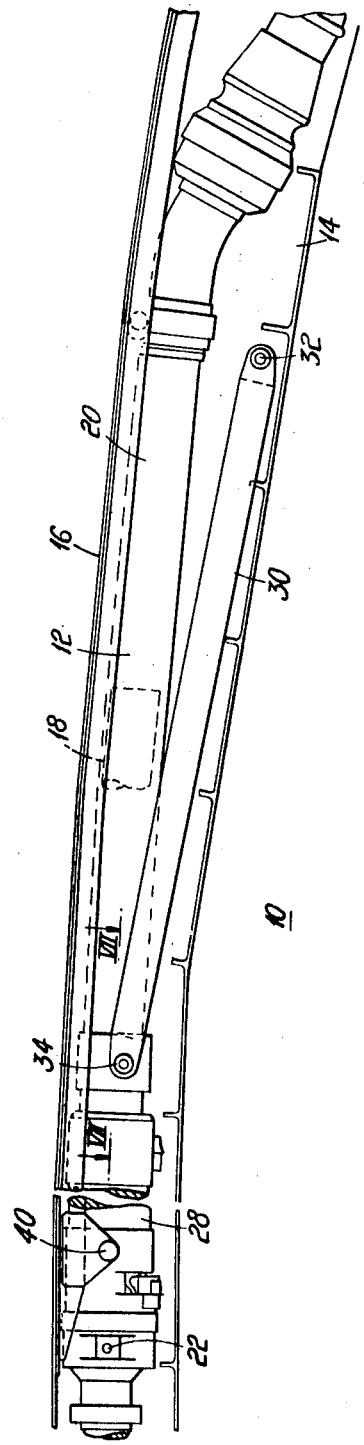

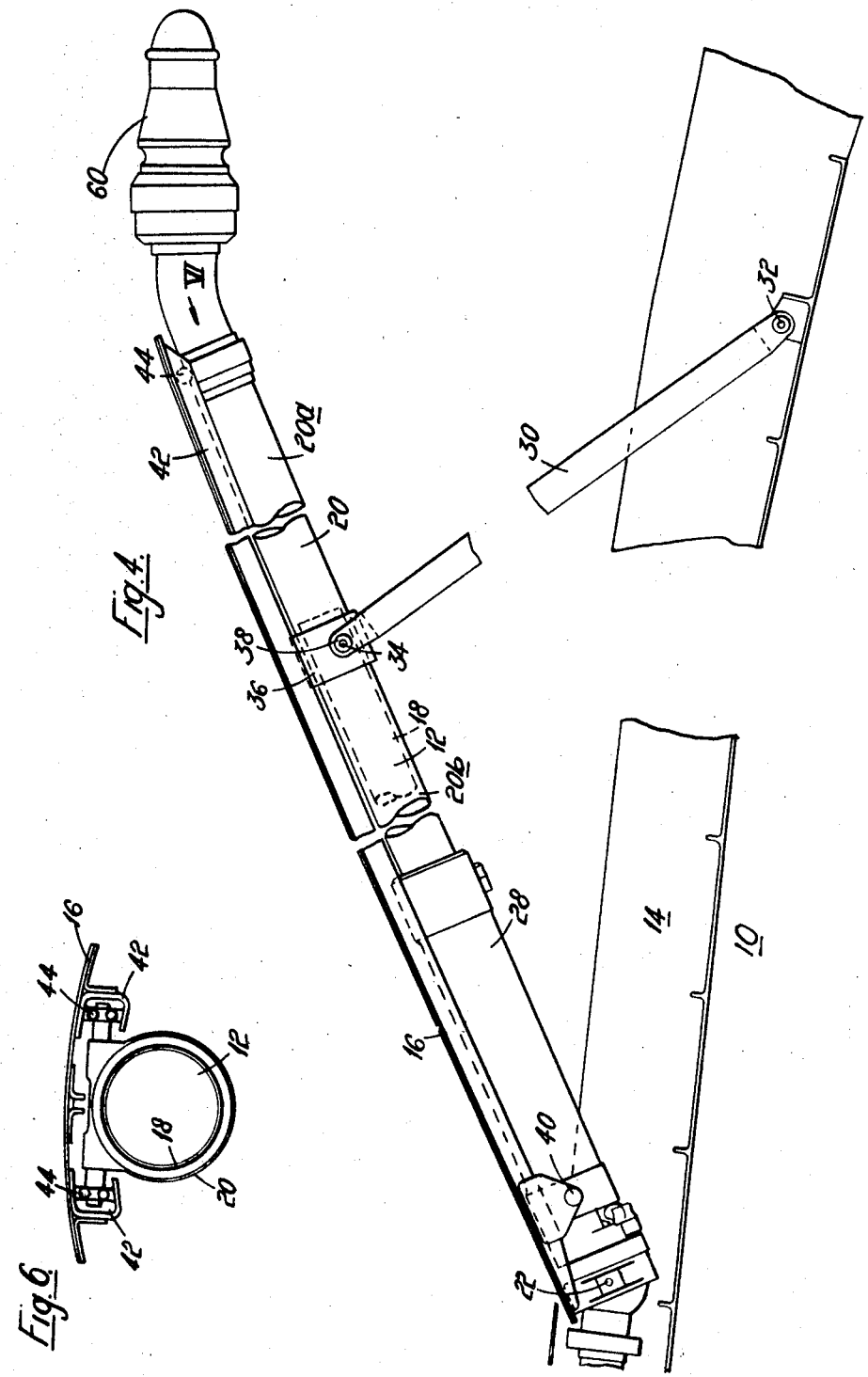

RETRACTABLE IN-FLIGHT REFUELLING PROBE

This invention concerns aircraft which have pivotally mounted on them probes which can move between a stored position in which they lie substantially flush with the contours of the aircraft, and an operating position in which they project from the contours to receive fuel during flight, from a tanker aircraft flying above and ahead of them and which present a drogue into which the probe can fit.

There are difficulties deriving from the fact that the probe has to be stored in a small confined space substantially within the contour, and yet be extendible for the remote end of the probe to lie at a considerable distance from the aircraft. At the same time, the probe has to be structurally rigid to withstand aerodynamic stresses, and loads encountered during use.

According to this invention, a probe on an aircraft and for the purpose described, comprises first and second fuel pipes in telescopic relationship, the first pipe being pivoted to the aircraft about a first axis, and having an outer wall which concentrically surrounds it to define an annular cylinder, there being an annular piston which is slidable along the cylinder and is fastened to the second pipe, the aircraft further having a support member one end of which is pivoted to the aircraft about a second axis, its other end being pivoted to the second pipe about a third axis, the three axes lying parallel and the third axis lying outwards of the first and second axes.

An aircraft embodying the present invention is described below with reference to the accompanying drawings in which:

FIG. 4 is a section on the upper part of the line III-III, that is to say with the probe extended;

FIG. 6 is an end view taken as indicated by the arrow VI seen in FIG. 4;

FIG. 7 is a fragmentary part section through the axial plane of the probe near where it attaches to the supporting member, and indicated by the arrows VII-VII seen in FIG. 3.

Figure 1:
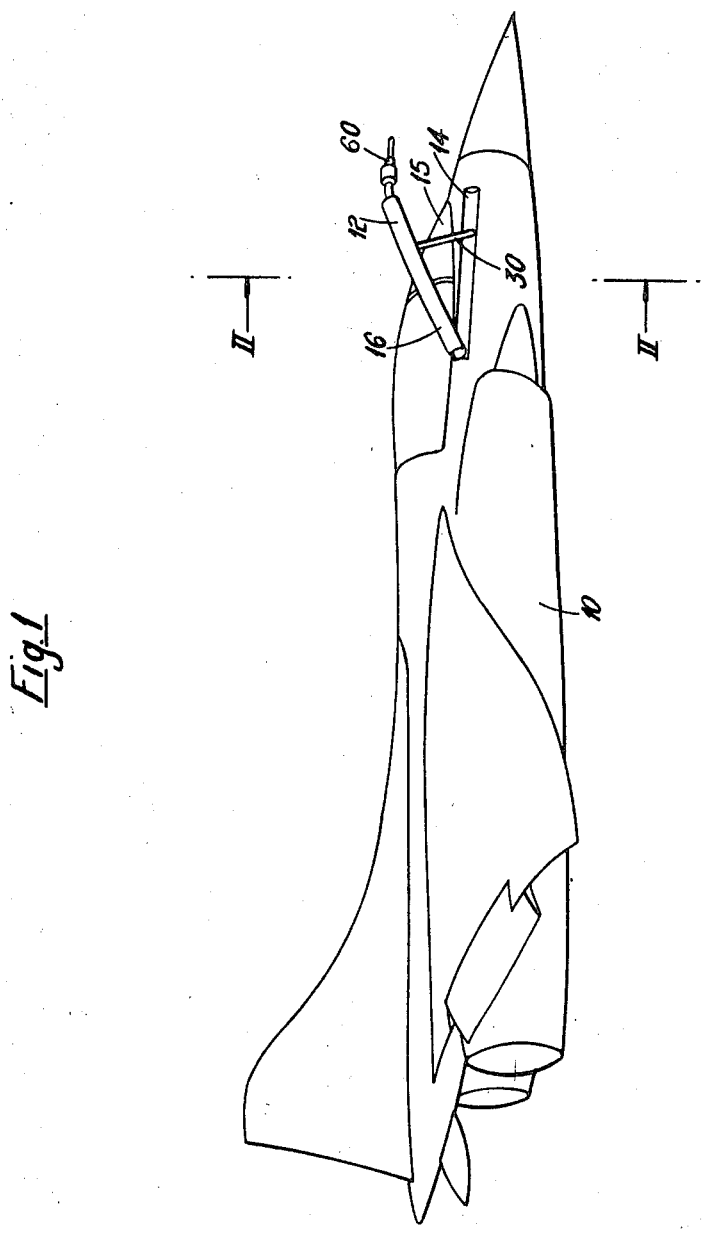
FIG. 1 is a perspective view of the aircraft.
Figure 2:
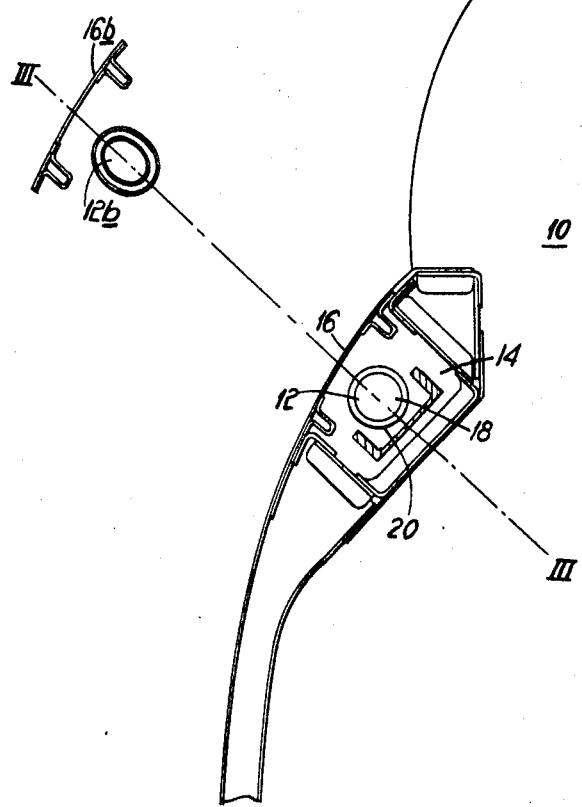
FIG. 2 is a section in the plane indicated by the arrows II-II seen in FIG. 1, but showing the probe in both its stored and extended positions, the reference numerals for the latter having suffix b.

An aircraft 10, has a probe 12, through which the aircraft can be refueled during flight from a tanker aircraft (not shown) flying above and ahead of it. The probe 12 in the view seen in FIG. 1 is in its extended position to receive fuel. In the stored position, however, the probe is retracted and lies within a recess 14 in the aircraft 10, lying just below a cockpit canopy 15, and in that position, a cover 16 carried by the probe covers the recess 14 and lies flush with the contour of the aircraft. The total conformity provided by the cover 12 with the contour of the fuselage is, however, not always necessary if a drag penalty can be tolerated, and by "substantially flush" in this specification is also meant the arrangement whereby the body of the probe lies slightly proud of the general contour but is intimately juxtaposed thereto.

As best seen in the other figures, the probe 12 comprises a first tube 18 and a second tube 20, which are fuel pipes and are in telescopic relationship. The first tube 18 is pivoted to the aircraft about a first axis 22. The aircraft also has a hydraulic jack comprising cylinder 24 and a piston 26. The cylinder 24 is annular and surrounds the first tube 18, being outwardly confined by an outer wall 28 which is concentric with the first tube 18. The piston 26 is annular and seals closely with the radially inner and outer cylindrical surfaces of the tube and the wall and is rigidly fastened to the second tube 20. Ports 25 and 27 respectively open into the left and right extremities of the cylinder 24, and connect with the aircraft to a source of hydraulic pressure. The selection of the port to receive the fluid, assuming the other to exhaust to a reservoir, determines the direction of movement of the piston 26.

The aircraft further has a support member 30, which is a simple link pivoted to the aircraft about second axis 32, and to the second tube 20 about a third axis 34.

For convenience of construction, the second tube 20 of the probe is constructed in two parts, designated 20a and 20b in FIG. 7. Both parts are rigidly fastened to an intermediate collar 36 which has an intimate sliding engagement with the first tube 18. The collar 36 carries on its exterior surface two spigots 38 by which it is pivotally connected to the link 30.

The cover 16 is pivotally mounted to the outer wall 28 of the hydraulic jack, at a pivot 40, and presents along its undersurface tracks 42 along which rollers 44, carried by the second part of the probe, can move during telescopic movement of the two tubes of the probe.

Figure 3:
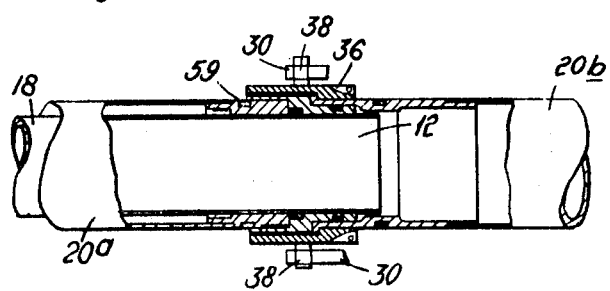
FIG. 3 is a section on the lower part of the line III-III seen in FIG 2; that is to say with the probe retracted.

As seen in FIGS. 3 and 4, the three axes 22, 32 and 34 are all parallel to one another. The pivot 34 lies outwards of a plane passing through the axes 22 and 32, in all positions.

Figure 5:
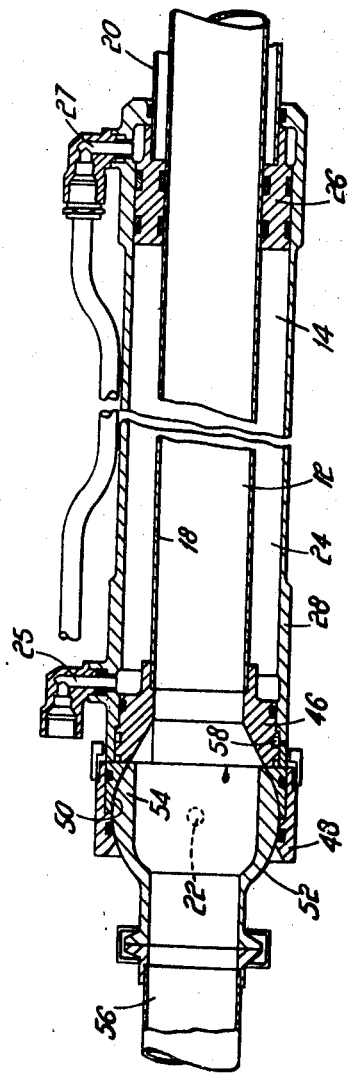
FIG. 5 is a fragmentary section through the axial plane of the probe, near where it is attached to the aircraft.

As seen best in FIG. 5, the end of the tube 18 near to the aircraft rigidly connects to an annular member 46, which also rigidly connects to the outer wall 28 of the hydraulic jack. The jack wall 28 and the member 46 further connect to a rigid annulus 48 which presents an internal part-spherical surface 50 to cooperate with an external part-spherical surface 52 on an end fitting 54 of a fuel line 56. The fuel line 56 is rigidly associated with the aircraft structure, and connects to its fuel tanks.

Between the member 46 and the wall 28 is a collection groove 58 which is vented to atmosphere. The purpose of this is that any high pressure hydraulic fluid which might escape along the space between the member 46 and the wall 28 is passed to atmosphere before it can pass into the fluid line which is the interior of the pipe 18. There is another groove 59 for the same purpose, passing through that part of the collar 36 which connects to the part of the second tube 20 which is slidingly sealed to the first tube 18.

As seen best in FIG. 4, in that plane the outer portion of the tube 20 which does not telescope, is slightly concave towards the aircraft, and the more remote part of the tube is even more curved in the same sense. The curves are present so that the probe fits neatly within the aircraft contour when retracted, and so that a tip 60 of the probe is correctly disposed when the probe is extended.

The probe is positioned on the aircraft so that it is easily seen by the pilot when extended and its location is easily seen when retracted, and the pilot can visually check that both positions have been achieved. When retracted it lies mounted alongside the cockpit of the aircraft, being slightly below the glazed canopy 15.

During normal flight, the probe 12 lies retracted within the recess 14 and covered by the cover 16. The tube 20 lies telescoped over and along the tube 18 to lie in the position seen in FIG. 3. In that position, referring to FIG. 5, the piston 26 lies at the left remote end of the cylinder 24.

To extend the probe in readiness for in-flight refueling, high pressure hydraulic fluid to be admitted into the left end of the cylinder 24 through the port 25. The piston 26 is thereby urged to the right, as viewed, and the rightward pressure on the piston 26 is transmitted to the attached tube 20a, the attached collar 36 and the tube 20b. There is therefore a rightward force exerted by the spigots 34 on the supporting link 30. This pressure on the links 30 has a clockwise moment about the axis 32, and in consequence the link 30 rotates clockwise, permitting the collar 36 to slide to the right along the tube 18 and the wall of the cylinder 24, and simultaneously causes the tubes 18, 20 and 28 to rotate anticlockwise about the pivot 22. The two movements, that is to say the outward telescoping of the tubes 18 and 20 and the rotations of the probe about the axis 22, and the lever 30 about the axis 32 all occur smoothly and simultaneously so that the probe reaches the extended and projected position seen in FIG. 4. During the movement, the cover 16 is carried by the probe, and the rollers 40 slide along the tracks 42. The tube 18 is sufficiently long for it always to retain sliding but sealing contact with the interior cylindrical surface of the collar 36, the relative extreme position of the two is seen in FIG. 7.

The fact that the hydraulic pressure causes a turning moment to be exerted on the links 30 and hence the probe, is a consequence of the third axis 34 lying outwards (from the aircraft) of the plane passing through the first and second axes 22 and 32, in the stored position.

To retract the probe after refueling, the reverse procedure is followed, namely high-pressure hydraulic fluid is admitted to the port 27 so that the piston 26 is forced to the left pulling the tube 20 and the collar 36 with it to telescope over the tube 18. The leftward movement of the piston and the wall 20 causes the lever 30 to be rotated anticlockwise as seen in FIG. 4, and the probe 12 to rotate clockwise simultaneously with telescoping. This continues until the probe reaches its retracted position wherein the cover 36 overlies the probe within the recess 14 and lies flush with the contour.

The arrangement described is particularly compact in construction and allows a probe to be built which can extend a sufficient distance from the aircraft fuselage, yet be sturdy enough to withstand operational stresses. By having the jack coaxial and concentric with the probe, much space is saved.

The present invention has been particularly described with reference to a "Probe-and-Drogue" in-flight refueling system, but is to be understood that many of the components of the probe are in fact irrelevant to this invention. The invention is concerned with the extension and retraction of the fuel pipe.

We claim:

1. A hydraulic probe on an aircraft with a fuel tank for receiving fuel in flight and being movable between a stored position in which it lies substantially flush with the contours of the aircraft and an operating position in which it projects from the contours of the aircraft, the hydraulic probe being simultaneously pivotally and telescopically movable to and from an operative position and comprising, 1 a pair of concentrically mounted tubes mounted on the aircraft at a first pivot and sealed at their inner end, and capable of carrying fuel to the fuel tank;

a third tube capable of moving axially along the annular space between the pair of concentric tubes;

an annular piston positioned with a tight sliding engagement between the walls of the pair of concentric tubes and carried adjacent the axially inner end of the third tube;

a sliding seal between at least one of the pair of concentric tubes and the third tube, the area lying axially between the sliding seal and the sealed inner end of the pair of concentric tubes being capable of receiving pressurized hydraulic fluid for extending or retracting the probe by movement of the annular piston; and a rigid link pivotally attached to the aircraft at a second pivot and to the third tube at a third pivot point, the axis of the three pivots being parallel with the third pivot being relatively outward from the first and second pivot, whereby the hydraulic probe can pivot and telescope simultaneously.

2. A hydraulic probe as in claim 1 where the third tube is formed in two parts which are operatively aligned and a collar having exterior spigots, the collar having a sliding sealing engagement with the axially inner tube of the pair of concentric tubes and fastening the two parts of the third tube together, whereby the exterior spigots provide the pivotal connection with the rigid link.

3. A hydraulic probe as in claim 1 adapted to be positioned in a recess of the aircraft including a cover which in the stored position of the tubes lies substantially flush with the contour of the aircraft, the cover having tracks along its undersurface and rollers mounted on at least one of the tubes to travel on the tracks during movement of the hydraulic probe, whereby the cover raised and lowered simultaneously with the extension and retraction of the hydraulic probe.

4. A hydraulic probe as in claim 1 further including means for removing any leaked hydraulic fluid to prevent mixing with the aircraft fuel.

5. A hydraulic probe as in claim 4 where the means for removing leaked hydraulic fluid includes a member having a collecting groove vented to the atmosphere.